US006996614B2

(12) United States Patent
Hallinan et al.

(10) Patent No.: US 6,996,614 B2
(45) Date of Patent: Feb. 7, 2006

(54) RESOURCE ALLOCATION IN DATA PROCESSING SYSTEMS

(75) Inventors: Michael Hallinan, Cheltenham (GB); Stephen James Paul Todd, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 810 days.

(21) Appl. No.: 09/727,623

(22) Filed: Dec. 1, 2000

(65) Prior Publication Data

US 2001/0029519 A1    Oct. 11, 2001

(30) Foreign Application Priority Data

Dec. 3, 1999   (GB) .................................. 9928503

(51) Int. Cl.
 *G06F 15/73*   (2006.01)
 *G06F 9/46*    (2006.01)
(52) U.S. Cl. ..................... 709/226; 718/100; 718/104
(58) Field of Classification Search ............... 379/201; 718/100, 104; 370/232; 714/48; 709/226
See application file for complete search history.

(56) References Cited

U.S. PATENT DOCUMENTS

| 5,764,626 A | * | 6/1998 | VanDervort | 370/232 |
| 5,826,270 A | * | 10/1998 | Rutkowski et al. | 707/10 |
| 6,151,688 A | * | 11/2000 | Wipfel et al. | 714/48 |
| 6,349,097 B1 | * | 2/2002 | Smith | 370/390 |
| 6,353,898 B1 | * | 3/2002 | Wipfel et al. | 714/48 |

* cited by examiner

*Primary Examiner*—David Wiley
*Assistant Examiner*—Arrienne M. Lezak
(74) *Attorney, Agent, or Firm*—John E. Campbell; Floyd A. Gonzalez (57) ABSTRACT

A method for allocating resources of a service provider to a plurality of users of the service provider in a data processing system wherein the resources are maintained in a resource pool when not allocated to a user and comprise a plurality of first and second resources, each second resource being associated with a first resource for use together with the associated first resource, and wherein, to invoke performance of a service by the service provider, a user issues a first resource request, requesting a first resource, one or more second resource requests, requesting one or more second resources, and, following receipt of the requested resources, issues a service request including the received first resource and at least one received second resource, requesting performance of the service, the method comprising steps of: dispensing dummy resources to a user in response to first and second resource requests, each dummy resource representing a resource requested by the user; and in response to the service request from the user, allocating corresponding resources from the resource pool to dummy resources dispensed to the user.

22 Claims, 4 Drawing Sheets

Figure 1

| PROXY LIST | | | RESOURCE POOL | |
|---|---|---|---|---|
| Proxy | Type | Reservation/Allocation | Handle | Type |
| pc1 | conn "QM" | hc3 | hc1 | conn "QM" |
| p15 | queue "Q5" | h35 | h11 | queue "Q1" |
| p16 | queue "Q6" | h36 | h12 | queue "Q2" |
| pc2 | conn "QM" | ?hc2 | ?hc2 | conn "QM" |
| p23 | queue "Q3" | ?h23 | ?h23 | queue "Q3" |
|  |  |  | h24 | queue "Q4" |

RESOURCE ALLOCATION IN DATA PROCESSING SYSTEMS

FIELD OF THE INVENTION

This invention relates generally to resource allocation in data processing systems, and more particularly to methods and apparatus in which resources of a service provider are allocated to users of the service provider in systems of the type discussed further below.

BACKGROUND OF THE INVENTION

Resource dispensers are known for dispensing resources of a service provider to a number of users of that service provider. For example, resource dispensers have been designed for use with IBM's MQSeries message queuing technology. MQSeries systems are described, for example, in the following publications available from IBM Corporation: "An Introduction to Messaging and Queuing", IBM document number GC33-0805-01; and "MQSeries—Message Queue Interface Technical Reference", IBM document number SC33-0850-01, both herein incorporated by reference. (IBM and MQSeries are trade marks of IBM Corporation). These message queuing systems provide one example of the type of system to which the present invention can be applied, and before discussing resource dispensers in more detail it is useful to consider briefly how these systems operate.

In an MQSeries message queuing system, a system program known as a "queue manager" provides message queuing services to a group of applications which use the queue manager to send and receive messages over a network. A number of queue managers may be provided in the network, each servicing one or more applications local to that queue manager. A message sent from one application to another is stored in a message queue maintained by the queue manager local to the receiving application until the receiving application is ready to retrieve it. Applications can retrieve messages from queues maintained by their local queue manager, and can, via the intermediary of their local queue manager, put messages on queues maintained by queue managers throughout the network. An application communicates with its local queue manager via an interface known as the MQI (Message Queue Interface). This defines a set of requests, or "calls", that an application uses to invoke the services of the queue manager. In accordance with the MQI, an application first requests the resources which will be required for performance of a service, and, having received those resources from the queue manager, the application then requests performance of the service specifying the resources to be used. In particular, to invoke any queue manager service, an application first requires a connection to the queue manager. Thus the application first issues a call requesting a connection with the queue manager, and, in response to this call, the queue manager returns a connection handle identifying the connection to be used by the application. The application will then pass this connection handle as an input parameter when making other calls for the duration of the connection. The application also requires an object handle for each object, such as a queue, to be used in performance of the required service. Thus, the application will submit one or more calls requesting object handles for each object to be used, and appropriate object handles will be dispensed by the queue manager. All object handles supplied by the queue manager are associated with a particular connection handle, a given object handle being supplied for use by a particular connection, and hence for use together with the associated connection handle. After receiving the resources to be used, the application can issue a service request call requesting performance of a service. This call will include the connection handle and the object handle for each object to be used. In the case of retrieving a message from a queue for example, the application issues a "get message" call including its connection handle and the appropriate queue handle dispensed to the application to identify the connection and queue to the queue manager.

In general, the supply of resources by a service provider involves various processing operations, and these operations can be expensive in terms of processor time. For example, in the case of the queue manager discussed above, when a connection is requested various security checks are performed and the queue manager sets up a control block in memory relating to that connection. Similar control blocks are set up for each object handle requested under that connection. These operations represent an expensive overhead. While this overhead is incurred only once for the duration of each connection, each time an application disconnects from the queue manager, the control blocks are freed. The resources are thus given up and new resources must be created when the application next requires the queue manager's services. In systems such as this where multiple users may be accessing the service provider for short periods many times a day, the demands associated with supply of resources can be particularly onerous.

Resource dispensers are employed to alleviate the problem just described. In the message queuing scenario for example, a resource dispenser may be disposed between the queue manager and the group of applications which that queue manager serves so as to intercept communications between the two. In particular, when an application issues a disconnect call to disconnect from the queue manager, instead of forwarding this call to the queue manager, the resource dispenser simply stores the released resources in a resource pool. When an application next requests resources, appropriate handles are dispensed from the resource pool if available, thus avoiding the overhead associated with obtaining new handles from the queue manager. Clearly a new handle must be obtained from the queue manager if the resource pool does not contain an appropriate resource, but over time the resource dispenser will tend to accumulate a pool of resources sufficient to service the applications using the queue manager.

There is a particular problem with the operation of known resources dispensers in systems such as that described above. This problem is highlighted by the following simple example using the message queuing system already described by way of illustration. Suppose that two applications, Application 1 and Application 2, use the same local queue manager "QM" and that the resource pool maintained by the resource dispenser is initially empty. Application 1 uses two message queues, "Q1" and "Q2", and Application 2 also uses two queues, "Q3" and "Q4". When Application 1 starts running it firsts requests a connection with the queue manager using the MQSeries call MQCONN. The application then requests object handles for the queues it will use. In this example the queue handles are requested singly using the MQSeries call MQOPEN. The three resource request calls and the resource handles returned to the application can be represented as follows:

hc1=MQCONN ("QM")

h1=MQOPEN (hc1, "Q1")

h2=MQOPEN (hc1, "Q2")

where hc1 is a connection handle for the queue manager QM, and h1 and h2 are object handles for the queues Q1 and Q2 respectively under this connection.

The application will then use these resources to invoke the required service. Suppose that the application retrieves a message from queue Q1 and generates a reply which it then puts in queue Q2. The application requests retrieval of the message from Q1 using the MQSeries call:

MQGET (hc1, h1)

where here, and throughout this specification, additional parameters included in the MQSeries call format have been omitted for clarity.

After receiving the message and generating a reply, the application sends the reply to queue Q2 using the MQSeries call:

MQPUT (hc1, h2)

Similarly, suppose that Application 2 retrieves a message from queue Q3 and puts a reply on queue Q4, and that handles are dispensed in response to the resource requests as follows:

hc2=MQCONN ("QM")
h3=MQOPEN (hc2, "Q3")
h4=MQOPEN (hc2, "Q4")

where hc2 is a connection handle for the queue manager QM, and h3 and h4 are object handles for the queues Q3 and Q4 respectively under this connection. After each application has run once there will be six resources in the resource pool:

hc1 (for "QM")
hc2 (for "QM")
h1 (for "Q1")
h2 (for "Q2")
h3 (for "Q3")
h4 (for "Q4")

However, since each object handle is associated with the connection handle under which it was issued, these resources effectively fall into two groups as follows:

hc1 (for "QM") hc2 (for "QM")
h1 (for "Q1" under hc1) h3 (for "Q3" under hc2)
h2 (for "Q2" under hc1) h4 (for "Q4" under hc2)

Suppose now that a second instance of Application 2 runs and requests a connection handle as before. When a resource request is received the resource dispenser does not know what further resources might be requested by the application. In this case, therefore, where the resource pool contains two available connection handles, the resource dispenser is likely to dispense the first connection handle in the resource pool, namely hc1. When the application now requests an object handle for queue Q3, no suitable resource is available in the pool since there are only queue handles for queues Q1 and Q2 under hc1. Thus, the resource request must be forwarded to the queue manager to obtain a new object handle for queue Q3 under hc1. The same situation occurs when the application requests a handle for queue Q4, so that when this application disconnects from the queue manager the resource pool will be as follows:

hc1 (for "QM") hc2 (for "QM")
h1 (for "Q1" under hc1) h3 (for "Q3" under hc2)
h2 (for "Q2" under hc1) h4 (for "Q4" under hc2)
h5 (for "Q3" under hc1)
h6 (for "Q4" under hc1)

Thus, due to the restrictions imposed by the association between connection and object handles, the dispensing of hc1 by the resource dispenser here resulted in additional resources being obtained from the queue manager and added to the resource pool. There was, however, a suitable group of resources, i.e. hc2 and the associated queue handles h3 and h4, already available in the pool. It can be seen from extrapolation of this simple example that, in general after a long run, every connection handle will have an associated object handle for each object required by each application. In view of the overhead associated with generation of these handles in the queue manager as discussed above, this constitutes a significant waste of resources.

While the above example highlights a problem with particular reference to resource dispensing in a message queuing system, the same problem can arise in other data processing systems and further examples will be described below. The present invention addresses this problem, and can be applied to advantage where resources of a service provider are allocated to a plurality of users of the service provider in any data processing system wherein;

the resources are maintained in a resource pool when not allocated to a user; and the resources comprise a plurality of first and second resources, each second resource being associated with a first resource for use together with the associated first resource; and to invoke performance of a service by the service provider, a user issues a first resource request, requesting a first resource, one or more second resource requests, requesting one or more second resources, and, following receipt of the requested resources, issues a service request including the received first resource and at least one received second resource, requesting performance of the service.

SUMMARY OF THE INVENTION

According to one aspect of the present invention there is provided a method for allocating resources of a service provider to a plurality of users of the service provider in a data processing system of the general type just described, the method comprising: dispensing dummy resources to a user in response to the first and second resource requests, each dummy resource representing a resource requested by the user; and in response to the service request from the user, allocating corresponding resources from the resource pool to dummy resources dispensed to the user.

Thus, in contrast to the prior systems discussed above where resources are dispensed sequentially in response to successive resource requests, in embodiments of the present invention dummy resources are dispensed to a user in response to the resource requests. The dummy resources are effectively "proxies", each representing a particular resource requested by the user. The "real dispensing", i.e. the allocation of resources from the resource pool, is deferred until the user issues a service request. Pooled resources are then allocated to the dummy resources dispensed to the user. This allows more efficient allocation of pooled resources, since the particular pooled resources to be allocated can be selected based on the set of associated resources requested by the user. Thus, selection of inappropriate resources resulting in additional resources being obtained from the service provider to satisfy subsequent resource requests, and the consequent accumulation of resources in the resource pool, can be avoided. For example, in the scenario discussed above, use of a resource allocation method embodying the invention would result in allocation of hc2 and the associated queue handles to the second instance of Application 2, thus avoiding the need to obtain handles h5 and h6 from the queue manager.

In some embodiments of the invention, when the service request is received, pooled resources may be allocated to dispensed dummy resources according to the best match between the set of resources represented by the dummy resources dispensed to the user and groups of associated first and second resources in the resource pool. Here, if there is a choice of more than one group with all of the requested resources, any of these groups may be selected or, more preferably, the group having the least overall resources may be selected. While such embodiments provide a particularly simple implementation, there is a risk that a dummy resource will be dispensed to a user, apparently granting a resource request, when in fact no suitable resource is available, either in the resource pool or from the service provider. For example, there may be a restriction on the number of resources which can be dispensed by the service provider, so that a request for a new resource for allocation to a dummy resource already dispensed to a user might be refused. In this event, the user would not be informed of the problem until the service request is issued. While this may be acceptable in some systems, it will usually be desirable to avoid the apparent granting of resource requests which must then be revoked at the service request stage. Accordingly it is preferable, in response to the first and second resource requests from a user, to reserve a resource in the resource pool corresponding to each resource requested by the user. The reserved resources can then be allocated to the corresponding dispensed dummy resources in response to the service request as before. (The allocation is not restricted to the reserved resources however, and other pooled resources may be allocated if more appropriate as explained below). The main purpose of the reservations is therefore to "underwrite" the dummy resources dispensed to the user. If a suitable resource is not available in the pool at the reservation stage, a new resource can usually be obtained from the service provider and added to the resource pool at that stage. However, if a resource cannot be obtained from the service provider for some reason, this can be signaled to the user in response to the resource request.

Reservation of a pooled resource may be effected in practice by storing data in various ways to record the reservation in a memory of the system, and examples of suitable record systems are described below. While resource reservation ensures that real resources are available for the dummy resources dispensed to the user, the allocation of pooled resources to dummy resources is still not performed until the service request stage, and reservations can be changed as appropriate as successive resource requests are processed. Preferred methods involving changing of reservations will be described in detail below.

Arrangements can be envisaged where the service provider can interpret a service request which includes dummy resources, for example by accessing data indicating which resources have been allocated to the dummy resources. In preferred embodiments, however, the method includes the step of replacing the dummy resources in the service request by the respective allocated resources for forwarding to the service provider.

Depending on the nature of the data processing system, the first resources may be connection handles, each identifying a connection between the service provider and a user, and the second resources may comprise object handles, each identifying an object to be used by the service provider in performance of a service for the associated connection. Such an object may be any item which the service provider works with in performing a service for a user.

Methods embodying the invention may be implemented by a suitably programmed processor, and another aspect of the invention provides a computer program element comprising computer program code means which, when loaded in a processor of a data processing system, configures the processor to perform a method as hereinbefore described.

Another aspect of the present invention provides apparatus for allocating resources of a service provider to a plurality of users of the service provider in a data processing system wherein the resources are maintained in a resource pool when not allocated to a user and comprise a plurality of first and second resources, each second resource being associated with a first resource for use together with the associated first resource, and wherein, to invoke performance of a service by the service provider, a user issues a first resource request, requesting a first resource, one or more second resource requests, requesting one or more second resources, and, following receipt of the requested resources, issues a service request including the received first resource and at least one received second resource, requesting performance of the service, the apparatus comprising: a memory for storing the resources; control logic for receiving the first, second and service requests from the users, the control logic being adapted: to maintain the resources in a resource pool of the memory when the resources are not allocated to a user; to dispense dummy resources to a user in response to the first and second resource requests from the user, each dummy resource representing a resource requested by the user; and in response to the service request from the user, to allocate corresponding resources from the resource pool to dummy resources dispensed to the user.

A further aspect of the present invention provides data processing apparatus comprising: a service provider for performing services for a plurality of users, the service provider being operable to supply resources for use by the users, the resources comprising a plurality of first and second resources, each second resource being associated with a first resource for use together with the associated first resource, and a resource dispenser arranged to receive the resources supplied by the service provider, the resource dispenser comprising apparatus for allocating resources as defined above.

The invention also provides a data processing system comprising such data processing apparatus, the system including a plurality of users connectable to the resource dispenser, each user being adapted to invoke performance of a service by the service provider by issuing a first resource request, requesting a first resource, one or more second resource requests, requesting one or more second resources, and, following receipt of the requested resources, issuing a service request including the received first resource and at least one received second resource, requesting performance of the service.

It is to be understood that, in general, where features are described herein with reference to a method embodying the invention, corresponding features may be provided in accordance with apparatus embodying the invention, and vice versa.

BRIEF DESCRIPTION OF THE DRAWINGS

Embodiments of the invention will now be described, by way of example, with reference to the accompanying drawings in which.

DETAILED DESCRIPTION OF THE PREFERRED EMBODIMENTS

Figure 1:
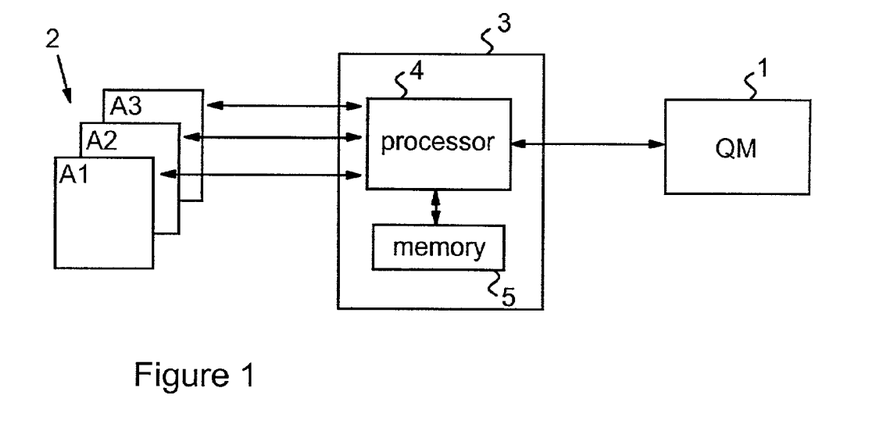
FIG. 1 is a schematic block diagram of one example of a data processing system embodying the invention.

Referring to FIG. 1, the data processing system of this embodiment includes a service provider in the form of a queue manager (QM) 1 for providing message queuing services to a plurality of users, indicated generally at 2, represented by a set of application programs A1, A2 and A3. Here, more than one instance of an application A1 to A3 may be running at any time, and each instance of an application can be considered as a separate user. A resource dispenser 3 is connected to the queue manager 1 and serves to allocate queue manager resources to the applications A1 to A3 when the applications require the queue manager's services. The resource dispenser 3 intercepts communications between the applications A1 to A3 and the queue manager 1. In this preferred embodiment, the interface between an application and the resource dispenser 3 is the same as that between resource dispenser 3 and queue manager 1, so that the operation of the resource dispenser is transparent to the queue manager and applications. That is, in operation, an application is not aware that it is calling a resource dispenser rather than a queue manager, and the queue manager is similarly unaware that it is being called by a resource dispenser rather than an application. However, it will be apparent to those skilled in the art that the resource dispenser and service provider could present different interfaces in other embodiments, with the users and/or service provider aware of the presence of the resource dispenser. For example, the service provider could provide additional, "private" interfaces to resource dispensers which are not available to direct users.

The resource dispenser 3 includes control logic for implementing the resource dispensing functions to be described in detail below. In general, the control logic may be implemented in hardware or software, or a combination thereof. In this example, the control logic is implemented by a processor 4 which is configured by software to perform the required functions, and suitable software will be apparent to those skilled in the art from the description herein. The software may be supplied separately, as an independent element or an element of the program code for a system program, for loading in processor 4 in known manner. Alternatively, the processor may be preconfigured with the required software. The resource dispenser 3 also includes a memory 5 in which processor 4 maintains various data associated with the resource dispensing operation as discussed further below.

The resource dispenser 3 operates to allocate first and second resources of the queue manager 1 to applications 2. In this embodiment, the first resources are connection handles and the second resources are object handles. These resources are initially generated by the queue manager as described earlier for use by applications in requesting particular message queuing services. Each connection handle serves to identify a connection between the queue manager and an application, and may be, for example, a pointer to a location in the queue manager memory (not shown) at which information about that connection is stored. Each object handle, which may also be a pointer to information about that object in the queue manager memory, serves to identify an object to be used by the queue manager in performance of a service for a particular connection. Thus, each object handle is associated with the connection handle for the particular connection under which it was issued, and is used by an application together with that connection handle to access an object to be worked with. For the sake of simplicity, the objects considered in the following discussion are message queues to which the queue manager has access, but in practice services may involve other items for which object handles are similarly supplied.

In operation, resources initially supplied by the queue manager 1 are allocated to an application 2 until the application issues a disconnect call to terminate the connection with the queue manager. Instead of forwarding this call to the queue manager, the resource dispenser simply stores the released resources in memory 5. A pool of available resources is thus gradually accumulated in the memory. When resources are subsequently required by an application, if suitable resources are available in this resource pool then these resources are allocated by the resource dispenser, thus reducing the overhead associated with supply of resources by the queue manager. However, to invoke the services of the queue manager, an application generally issues a number of resource requests for resources that will be required, and, having received the required resources, then issues a service request for performance of a service. In response to each resource request from an application, the processor 4 dispenses a dummy, or "proxy", resource, in this case a proxy connection or object handle, rather than a real handle from the resource pool. Prior to dispensing the proxy handle, the processor 4 checks whether the resource pool contains a real handle corresponding to that requested by the application, and, if so, reserves that handle for possible allocation to the application at a later stage. If no suitable resource is available in the pool, the processor 4 requests an appropriate resource from the queue manager, adds it to the pool and reserves it for the application. When the processor 4 subsequently receives a service request from the application, the reserved resources are allocated to the corresponding dummy handles dispensed to the application. The allocated resources are then excluded from the resource pool until released again when the application terminates its connection. Prior to allocation, reservations of pooled resources can be changed as further resource requests are received, and the criteria for changing reservations will be explained in detail below.

Figure 2:
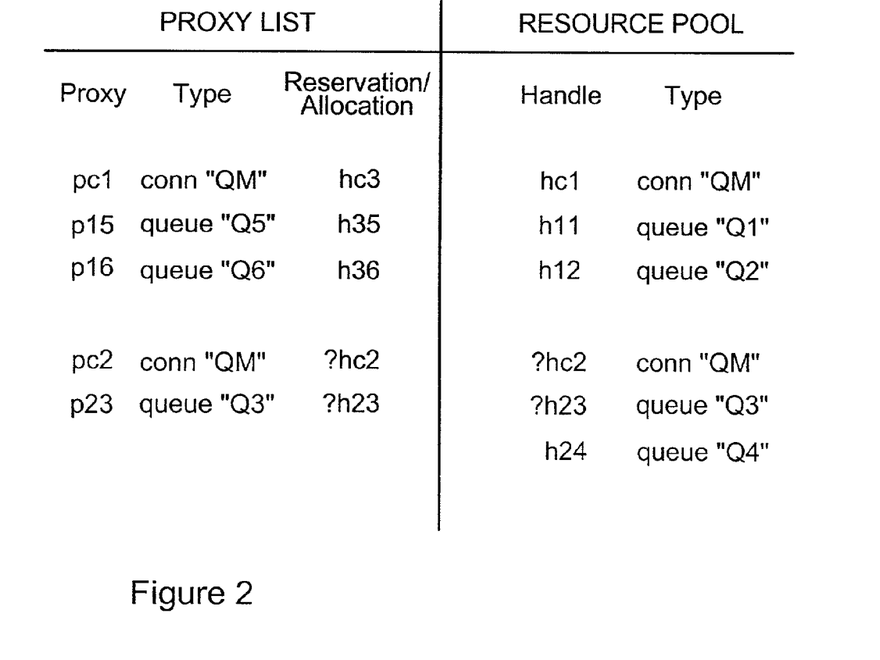
FIG. 2 is a schematic illustration of data stored in a memory of the resource dispenser in the system of FIG. 1.

Processor 4 maintains various data in memory 5 relating to the resource dispensing operation. FIG. 2 is a schematic representation of the data maintained in the present embodiment. The data essentially consists of two lists, one list relating to the resource pool and the other relating to the proxy handles dispensed to applications. As shown on the right-hand side of the figure, the resource pool contains a list of the handles that are available for allocation. In the simple example illustrated, connection handles are denoted by "hc" and object handles by "h". Data defining the handle type is stored against each handle in the resource pool. Thus, here there are two connection handles hc1 and hc2 in the pool, each for a connection to the queue manager QM. Two queue handles are associated with each connection handle hc1 and hc2 in the pool. Handles h11 and h12 are handles for queues Q1 and Q2 respectively under hc1, and handles h23 and h24 are handles for queues Q3 and Q4 under hc2. Thus, the resource pool contains two groups of associated connection and object handles. In this regard, while the queue handles are shown listed below their associated connection handle to highlight the grouping, in practice the association between connection and object handles could be indicated in other ways, for example by storing against each object handle the connection handle with which it is associated. The flag "?" preceding hc2 and h23 in the second group indicates that these handles are currently reserved as explained below.

The left-hand side of the figure shows the data stored in this embodiment for each proxy handle dispensed to an application. This consists of the proxy handle itself, the type of resource which the proxy represents, and a reservation/allocation entry. For the sake of clarity, proxy connection handles are denoted by "pc" and proxy object handles by "p" in the figure. In practice, however, any appropriate data may be used as a proxy handle. Most conveniently, the proxy handles are simply arbitrary numbers generated by the processor 4 by incrementing a count each time a new proxy handle is to be dispensed. In the example illustrated, there are two active applications and two proxy handles pc1 and pc2 have been dispensed as connection handles for the queue manager QM. Two proxy queue handles p15 and p16, for queues Q5 and Q6 respectively, have been dispensed under pc1. A proxy queue handle p23 for queue Q3 has been dispensed under pc2. Again, the grouping of associated proxy handles is indicated here by listing proxy queue handles under their associated proxy connection, but in practice the association may be indicated in any convenient manner.

For each proxy handle, data is stored indicating the real resource reserved or allocated to that handle. In this case, an allocation is indicated by an entry consisting of the corresponding real resource. A reservation entry consists of the real resource preceded by a reservation flag "?". Thus, in the example shown, proxies pc1, p15 and p16 have been allocated real handles hc3, h35 and h36 respectively. These real resources have therefore been removed from the resource pool at the time of allocation. Connection handle hc2 has been reserved for proxy connection pc2, and the associated handle for queue Q3 has been reserved for proxy handle p23. The fact that these handles have been reserved is also indicated by the reservation flags against hc2 and h23 in the resource pool.

In the example of FIG. 2, the particular resource which each proxy represents is stored separately in the proxy list for each proxy handle. However, this is not essential since the resource type is also indicated indirectly via the reservation/allocation. Moreover, embodiments can be envisaged where the proxy handle itself indicates the type of resource requested. In addition, various other systems may be used to record the reservation or allocation of resources to proxies. For example, a proxy could be stored against the corresponding pooled resource, with a flag set to indicate whether the resource has been allocated or just reserved. In this case, allocation effectively excludes the resource from the resource pool, though the resource itself need not be removed from the list.

Figure 3:
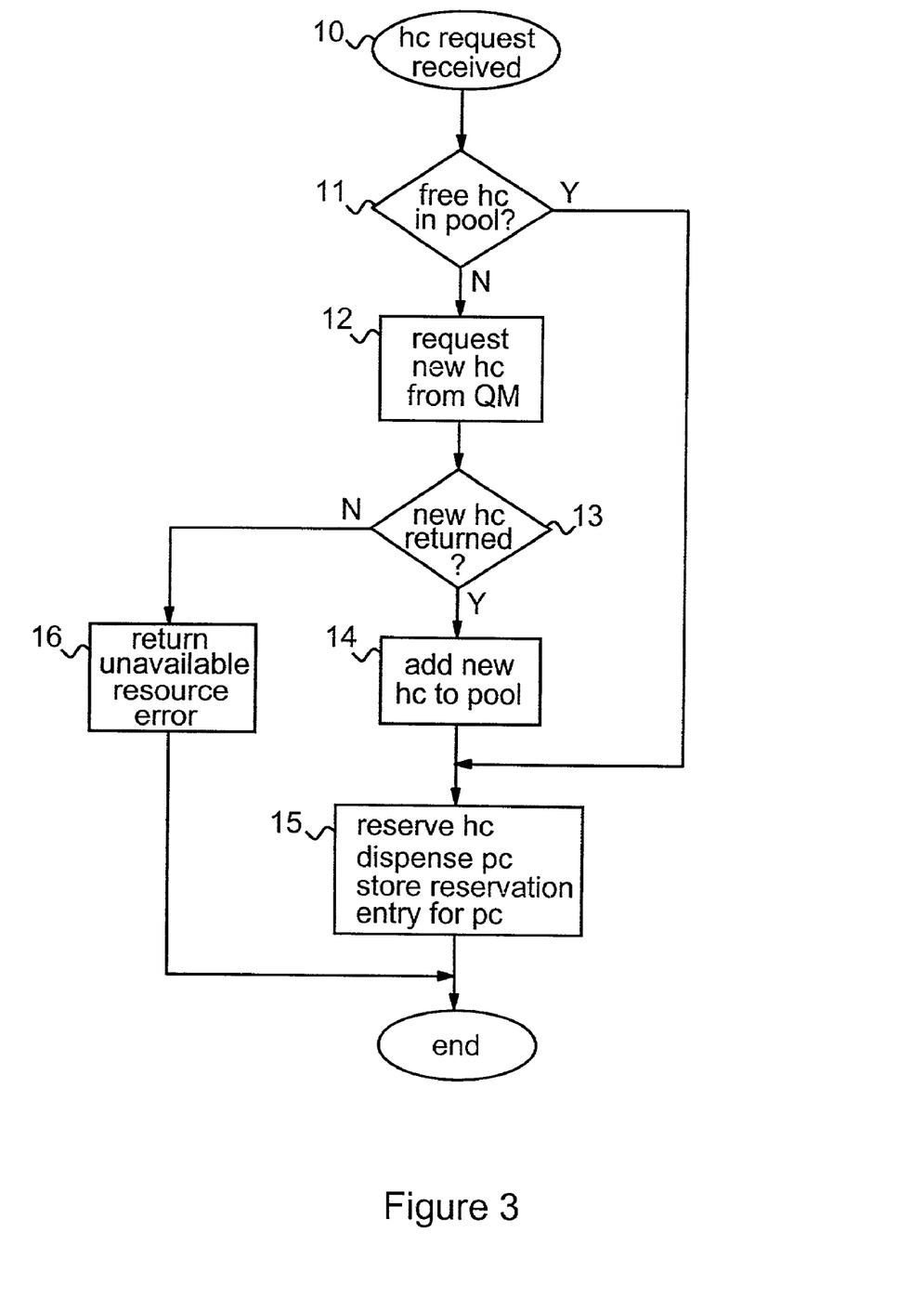
FIG. 3 is a flow chart describing operation of the resource dispenser in response to a first resource request.

Operation of the system will now be described in detail with reference to the flow charts of FIGS. 3 to 5. FIG. 3 describes the operations performed by the processor 4 of resource dispenser 3 in response to an MQCONN call from an application 2. As described earlier, the MQCONN call is a request for a connection handle hc and the process begins at step 10 when this request is received. Operation proceeds to step 11 in which processor 4 accesses the resource pool in memory 5 to determine if there a free, i.e. unreserved, connection handle in the pool. If not, in step 12 the processor requests a new connection handle from the queue manager 1 by forwarding the MQCONN call. At decision block 13, if a new connection handle is returned by the queue manager 1, the process continues to step 14 where the new connection handle hc is stored in the resource pool of memory 5. Then, in step 15, the processor sets the reservation flag "?" for the new handle in the resource pool, dispenses a proxy connection handle pc to the application 2, and records the proxy in the proxy list of memory 5 together with the reservation entry "?hc" indicating that the new handle has been reserved for that proxy. The process is then complete.

Returning to step 13, if the queue manager is unable to supply a new connection handle, for example because resource limits have been reached, then in step 16 the processor returns an "unavailable resource" error to the application, and the process is complete. Referring back to step 11, if the processor 4 determines here that the resource pool does contain a free connection handle, then operation proceeds directly to step 15 where the existing connection handle is reserved, the proxy pc is dispensed and the reservation is entered in the proxy list.

The following examples illustrate the data stored in memory 5 of the resource dispenser before and after performance of the FIG. 3 process in the circumstances indicated for each example. For the sake of clarity, only data pertinent to the particular example is shown in each case, and notation has been simplified compared to that used in FIG. 2. Each example indicates the calls made by the application 2 and resource dispenser 3, and the (real or proxy) resource that is returned. In these and similar examples below, the notation "+++" is used to indicate a call made by an application 2 to resource dispenser 3. Such calls always use and return proxies. The notation ">>>" is used to indicate a call made by resource dispenser 3 to queue manager 1. These calls always use and return real handles. (All the examples below are independent and do not necessarily follow on from the previous one).

EXAMPLE 1

Request For Connection Handle with no Free Handle in Resource Pool (FIG. 3 Steps 11N, 12, 13Y, 14, 15).

+++ MQCONN ("QM") returns pc1, with reservation on newly obtained hc1

>>> MQCONN ("QM") returns hc1

| BEFORE | | AFTER | |
| --- | --- | --- | --- |
| PROXY LIST Proxy Type R/A | RESOURCE POOL Handle Type | PROXY LIST Proxy Type R/A | RESOURCE POOL Handle Type |
| | | pc1 QM ?hc1 | ?hc1 QM |

EXAMPLE 2

Request for Connection Handle with Free Handle in Resource Pool (FIG. 3 Steps 11Y, 15).

+++ MQCONN ("QM") returns pc1, with reservation on hc1 from pool

>>> none

| BEFORE | | AFTER | | | |
|---|---|---|---|---|---|
| PROXY LIST Proxy Type R/A | RESOURCE POOL Handle Type | PROXY LIST Proxy Type R/A | | RESOURCE POOL Handle Type | |
| | hc1  QM | pc1 ?hc1 | QM | ?hc1 | QM |

Once an application has received a connection handle, in this case the proxy handle pc dispensed by processor 4, the application will then make one or more MQOPEN calls. These calls include the proxy connection handle returned by the previous connection request, and request object handles h for each queue to be used in performance of one or more services for the application. Operation of processor 4 in response to such an object request is shown in FIG. 4. When the request is received at step 20, the processor determines in step 21 whether the group of pooled resources containing the connection handle already reserved for the application contains a free object handle for the required queue. For example, referring to FIG. 2, if the MQOPEN call contains proxy connection handle pc2 and requests a handle for queue Q4 under this connection, the processor will refer to the reservation entry for pc2 to see that connection handle hc2 has been reserved for that connection, and will then check whether the resource group for hc2 in the resource pool contains a free handle for queue Q4. If so, operation proceeds directly to step 27 wherein the processor sets the reservation flag against that handle in the resource pool, dispenses a proxy object handle p to the application, and records the proxy in the proxy list of memory 5 together with the reservation entry. The process is then complete. The following example demonstrates this process.

EXAMPLE 3

Figure 4:
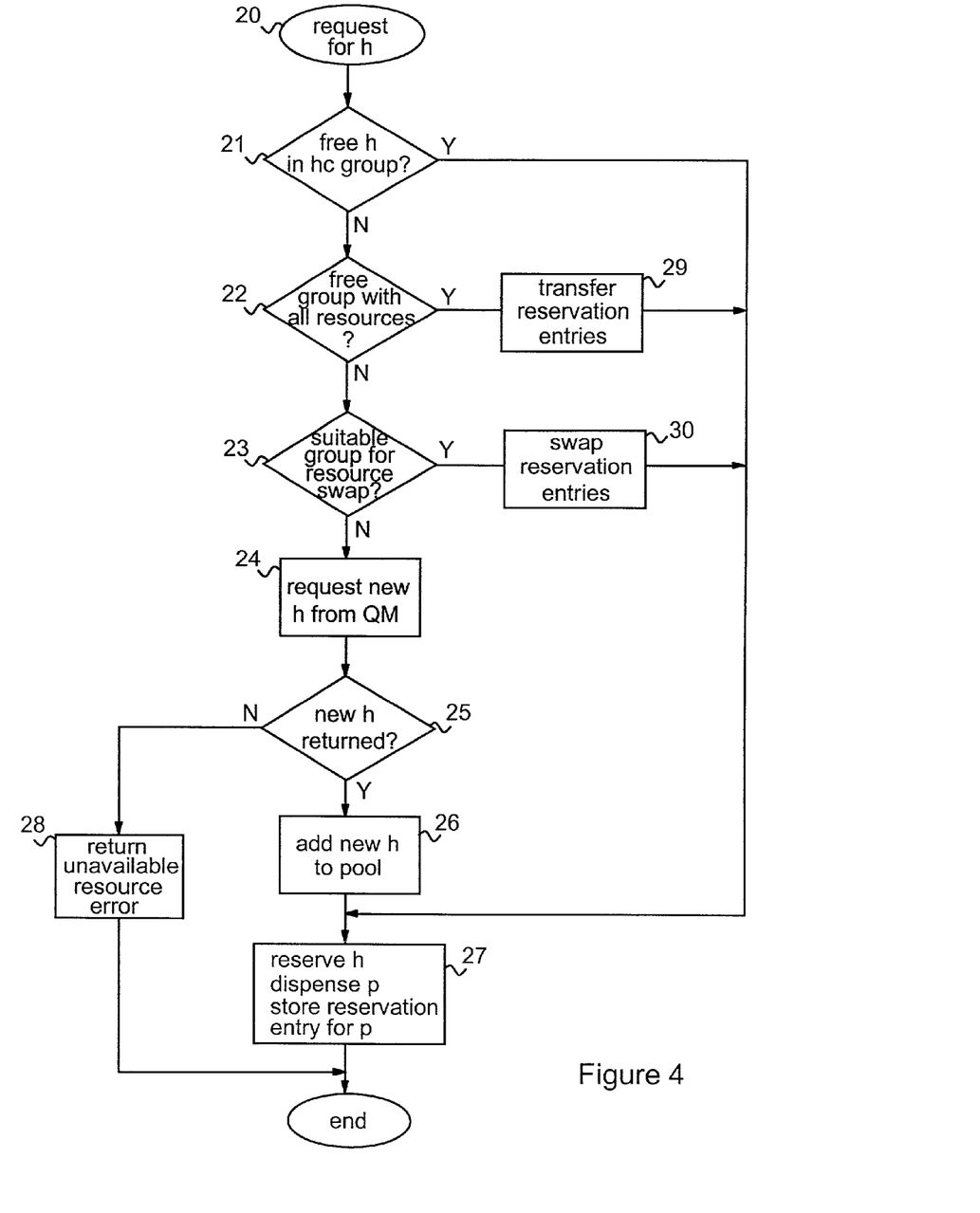
FIG. 4 is a flow chart describing operation of the resource dispenser in response to a second resource request.

Request for Queue Handle with Suitable Handle in Resource Pool (FIG. 4 Steps 21Y, 27).

+++ MQOPEN (pc1, "Q1") returns p11, with reservation on h11 from pool

>>> none

| BEFORE | | | | AFTER | | | |
|---|---|---|---|---|---|---|---|
| PROXY LIST Proxy Type R/A | | RESOURCE POOL Handle Type | | PROXY LIST Proxy Type R/A | | RESOURCE POOL Handle Type | |
| pc1 ?hc1 | QM | ?hc1 | QM | pc1 ?hc1 | QM | ?hc1 | QM |
| | | h11 | Q1 | p11 ?h11 | Q1 | ?h11 | Q1 |

If it is determined in step 21 that the group of pooled resources containing the reserved connection handle does not contain a suitable queue handle, then operation proceeds to step 22. Here, the processor 4 checks whether there is another group of free connection and object handles in the resource pool which group contains all the resources requested thus far by the application. Thus, the processor checks the proxy list for the resources requested previously by the application, and then checks whether the resource pool contains a free group including all these resources plus the newly requested handle for the current MQOPEN call. If a match is found, then in step 29 the existing reservations for the application are transferred to the new group. That is, the reservation entries in the proxy list are amended to refer to the corresponding resources in the new group, reservation flags are set against these resources in the resource pool, and the reservation flags are removed from the resources previously reserved for the application. Operation then proceeds to step 27 where the newly requested handle h is reserved in the new group, a proxy object handle p is dispensed to the application, and the proxy handle is recorded in the proxy list with the appropriate reservation entry. The following example illustrates this process.

EXAMPLE 4

Reservation Transfer in Response to Request for Queue Handle (FIG. 4 Steps 21N, 22Y, 29, 27).

+++ MQOPEN (pc1, "Q2") returns p12, with reservation transfer to new group

>>> none

| BEFORE | | | | AFTER | | | |
|---|---|---|---|---|---|---|---|
| PROXY LIST Proxy Type R/A | | RESOURCE POOL Handle Type | | PROXY LIST Proxy Type R/A | | RESOURCE POOL Handle Type | |
| pc1 ?hc1 | QM | ?hc1 | QM | pc1 ?hc2 | QM | hc1 QM | |
| p11 ?h11 | Q1 | h11 | Q1 | p11 ?h21 | Q1 | h11 Q1 | |
| | | | | p12 ?h22 | Q2 | | |
| | | hc2 | QM | | | ?hc2 QM | |
| | | h21 | Q1 | | | ?h21 Q1 | |
| | | h22 | Q2 | | | ?h22 Q2 | |

Returning to step 22, if no suitable free group is found in this step, the operation proceeds to step 23. Here, the processor determines whether the resource pool contains a group of associated resources, one or more of which is reserved for another application, such that the reservations can be swapped with those for the current application. This is possible where that other group contains all the resources requested thus far by the current application, and the group containing resources reserved for the current application includes resources corresponding to all those reserved for the other application. Thus, the processor 4 checks the proxy list for the handles requested previously by the current application, and then checks the resource pool for any (reserved or partially reserved) group containing all these handles plus the newly requested handle for the MQOPEN call. If such a group is found, the processor 1 identifies the reserved resources in that group from the reservation flags, and checks for, each of these reserved resources, whether there is a corresponding resource in the group containing resources reserved for the current application. If so, then operation proceeds to step 30 where the processor interchanges the reservations between the two groups. That is, the reservation entries against proxy handles dispensed to the current application are amended to refer to handles in the new group, and the reservation entries against proxy handles for the other application are amended to refer to handles in the group previously reserved for the current application. The reservation flags for the two groups in the resource pool are updated accordingly. Operation then proceeds to step 27 where the newly requested resource, in the new group, is reserved for the current application, a proxy handle is dispensed and the proxy recorded in the proxy list with the corresponding reservation entry. The following example demonstrates this process.

EXAMPLE 5

Reservation Swap in Response to Request for Queue Handle (FIG. 4 Steps 21N, 22N, 23Y, 30, 27).

+++ MQOPEN (pc1, "Q2") returns p12, with reservation swap between groups

\>>> none

| BEFORE | | | | AFTER | | | |
|---|---|---|---|---|---|---|---|
| PROXY LIST Proxy Type R/A | | RESOURCE POOL Handle Type | | PROXY LIST Proxy Type R/A | | RESOURCE POOL Handle Type | |
| pc1 ?hc1 | QM | ?hc1 | QM | pc1 ?hc2 | QM | ?hc1 | QM |
| p11 ?h11 | Q1 | ?h11 | Q1 | p11 ?h21 | Q1 | ?h11 | Q1 |
| | | | | p12 ?h22 | Q2 | | |
| pc2 ?hc2 | QM | ?hc2 | QM | c2 ?hc1 | QM | ?hc2 | QM |
| p21 ?h21 | Q1 | ?h21 | Q1 | p21 ?h11 | Q1 | ?h21 | Q1 |
| | | h22 | Q2 | | | ?h22 | Q2 |

Reverting to step 23, if the resource pool does not contain a suitable group for a resource swap here, then in step 25 a new object handle, associated with the connection handle currently reserved for the application, is requested from the queue manager 1. If a new object handle h is returned at step 25, this is added to the resource pool in step 26, and operation proceeds to step 27 as before. The following example illustrates this process.

EXAMPLE 6

Request for Queue Handle with no Suitable Handle in Resource Pool (FIG. 4 Steps 21N, 22N, 23N, 24, 25Y, 26, 27).

+++ MQOPEN (pc1, "Q1") returns p11, with reservation on newly obtained h11

\>>> MQOPEN (hc1, "Q1") returns h11

| BEFORE | | | | AFTER | | | |
|---|---|---|---|---|---|---|---|
| PROXY LIST Proxy Type R/A | | RESOURCE POOL Handle Type | | PROXY LIST Proxy Type R/A | | RESOURCE POOL Handle Type | |
| pc1 ?hc1 | QM | ?hc1 | QM | pc1 ?hc1 p11 ?h11 | QM Q1 | ?hc1 ?h11 | QM Q1 |

As indicated in this example, when forwarding the MQOPEN call to request a new object handle from the queue manager, the processor replaces the proxy handle in the call received from the application by the real handle reserved for that proxy.

Returning to step 25, if a new object handle is not available from the queue manager here, then the processor returns an unavailable resource error to the application in step 28 and the process is complete.

While step 23 of FIG. 4 provides for swapping of reservations between two resource groups in this embodiment, other embodiments may allow more complex transfer of reservations between multiple groups where appropriate. As a simplistic example, suppose that there are three active applications A1 to A3, and three groups of resources in the resource pool as follows (where a connection to the queue manager is denoted simply by "QM" here, and the associated queue handles by "Q1", "Q2", etc.):

| Group 1 | Group 2 | Group 3 |
|---|---|---|
| ?QM | ?QM | ?QM |
| ?Q1 | ?Q1 | ?Q1 |
| ?Q2 | Q2 | Q2 |
| | Q3 | |

Resources in Groups 1, 2 and 3 are reserved for applications A1, A2 and A3 respectively as indicated by the reservation flags. Suppose that A1 now requests a queue handle for Q3. Group 2 contains this resource but the reservations cannot be swapped between Groups 1 and 2 because Group 1 does not contain resource Q2 which is reserved in Group 2. However, the request can be satisfied by transferring A2's reservations from Group 2 to Group 3, A3's reservations from Group 3 to Group 1, and A1's reservations from Group 1 to Group 2. Q3 in Group 2 can then be reserved for A1, and a new resource request to the queue manager is avoided. Clearly, checking for the possibility of such reservation transfers between multiple resource groups involves more complex processing than step 23 of FIG. 5 since reservations must be compared between more than two groups to determine if a series of reservation transfers can be made to obtain a group with all the resources requested thus far by the application making the current object request. However, this extra processing may be justified in systems where generation of new resources by the service provider is particularly expensive.

The process described above is repeated by processor 4 for each object request received from an application prior to issue of the first service request by the application. Once the application has requested the required resources, it will then issue a service request. This call will include the proxy connection handle and at least one of the proxy object handles received from the processor 4. For example, the application may issue an MQGET call requesting retrieval of a message from queue Q5. If this application has been dispensed proxy connection handle pc1 shown in FIG. 2, and proxy handle p15 for queue Q5, then the service request would be: MQGET (pc1, p15), where other parameters have been omitted from the call format as noted earlier. Operation of the processor 4 in response to such a service request is shown in FIG. 5.

The process commences at step 40 each time the processor receives a service request. Operation proceeds to step 41 where the processor checks the reservation/allocation entry in the proxy list of memory 5 for the proxy connection handle in the service request to determine whether a real resource hc has already been allocated to the proxy connection handle. If not, then operation proceeds to step 42 where the handles currently reserved for the application are allocated to the corresponding proxy handles dispensed to the application. This involves removing the reservation flag in the reservation/allocation entry for each proxy, and, in step 43, removing the allocated handles from the resource pool. The reserved handles are thereby allocated to the application for the duration of the connection. Next, in step 44, the proxy handles in the service request are replaced by the corresponding allocated handles, and the service request is forwarded to the queue manager in step 45. The process is then complete. Reverting to step 41, if a real resource has already been allocated to the proxy connection handle in the service request here, then operation proceeds directly to step 44 and the process continues as previously described. The following two examples illustrate these processes.

EXAMPLE 7

Figure 5:
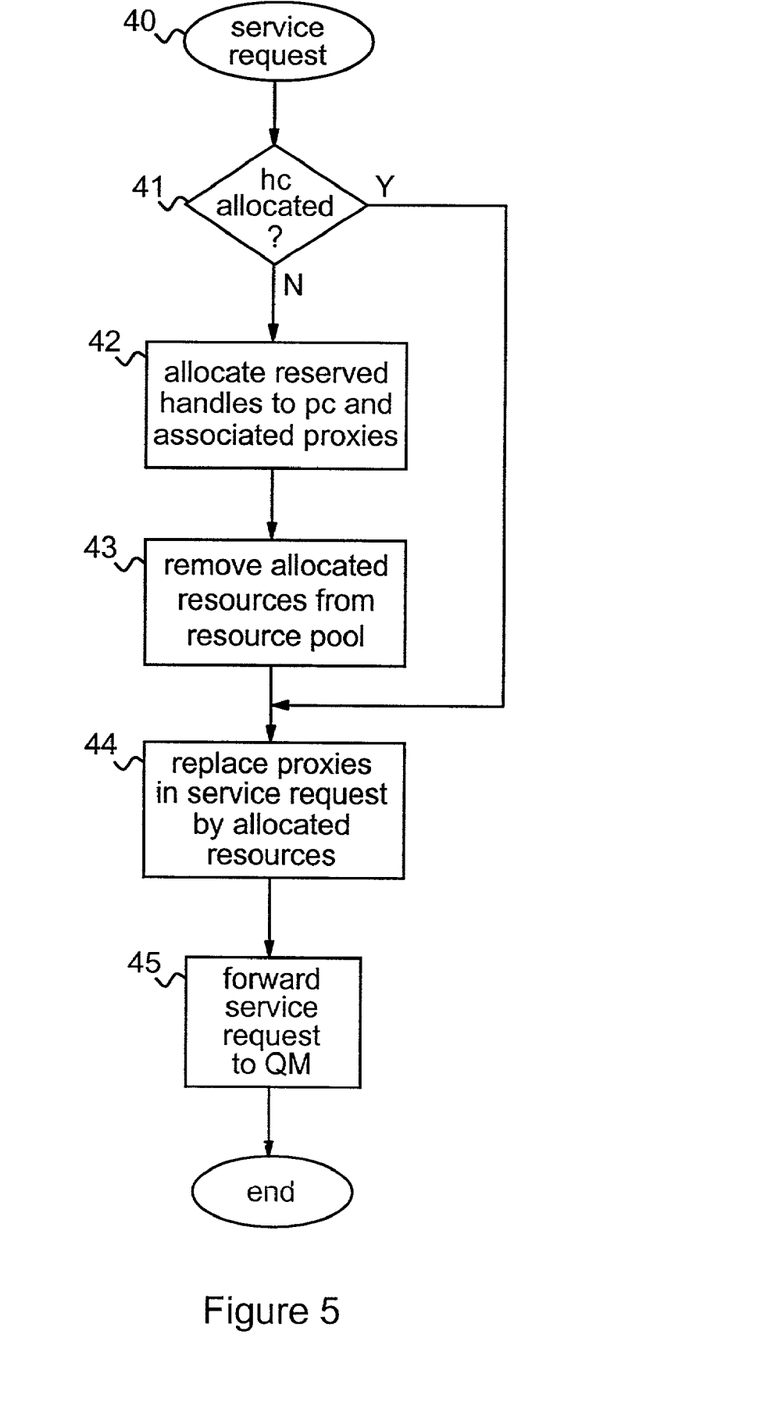
FIG. 5 is a flow chart describing operation of the resource dispenser in response to a service request.

Response to First Service Request (FIG. 5 Steps 41N, 42, 43, 44, 45).

+++ MQGET (pc1, p11) All reserved resources are allocated and removed from pool.

>>> MQGET (hc1, h11)

| BEFORE | | | | AFTER | |
|---|---|---|---|---|---|
| PROXY LIST Proxy Type R/A | | RESOURCE POOL Handle Type | | PROXY LIST Proxy Type R/A | RESOURCE POOL Handle Type |
| pc1 | QM | ?hc1 | QM | pc1 | QM |
| ?hc1 | | | | hc1 | |
| p11 | Q1 | ?h11 | Q1 | p11 | Q1 |
| ?h11 | | | | h11 | |
| p12 | Q2 | ?h12 | Q2 | p12 | Q2 |
| ?h12 | | | | h12 | |

EXAMPLE 8

Response to Subsequent Service Request (FIG. 5 Steps 41Y, 44, 45).

+++ MQGET (pc1, p11) No change to memory 5.

>>> MQGET (hc1, h11)

| BEFORE | | AFTER | |
|---|---|---|---|
| PROXY LIST Proxy Type R/A | RESOURCE POOL Handle Type | PROXY LIST Proxy Type R/A | RESOURCE POOL Handle Type |
| pc1 | QM | pc1 | QM |
| hc1 | | hc1 | |
| p11 | Q1 | p11 | Q1 |
| h11 | | h11 | |
| p12 | Q2 | p12 | Q2 |
| h12 | | h12 | |

While in step 42 of FIG. 5 the particular resources reserved for proxies are allocated to those proxies in this embodiment, in other embodiments the processor 4 may perform an additional step here to check that this is the optimum allocation. In particular, the processor may check whether the resource group containing the reserved resources is the smallest group that can meet the allocation needs. For example, if the resource pool contained another free group containing all the resources requested by the user, but less resources overall than the group containing the reservations, then it is more efficient to allocate resources from the smaller group and the processor would allocate these resources instead of the reserved resources. Otherwise, the reserved resources would be allocated as before.

While an application will often request all the resources required for all services which are to be performed in running of the application before the application issues the first service request, this is not always the case. After requesting resources and issuing one or more service requests as described above, an application may then request further resources in some cases. By way of example, an application may issue the following sequence of calls: MQCONN, MQOPEN, MQGET, MQOPEN, MQPUT, where the name of the queue to be specified in the second MQOPEN call, and used in the MQPUT call, is contained in the message retrieved by the MQGET call, so that a handle for this queue cannot be requested until after the MQGET call has been processed. For such further resource requests issued after the first service request, and hence after allocation of resources to the existing proxies, a proxy handle will be dispensed as before but a real resource will be allocated immediately to the proxy. The allocation choice is limited here to any appropriate handles remaining in the resource pool which are associated with the connection handle already allocated to the application. If there is no such handle available in the pool, then a new handle must be obtained from the queue manager for that connection. If the queue manager cannot supply the required resource then an unavailable resource error will be returned to the application. The processor identifies such further resource requests by checking, for each received object request, whether a real connection handle has already been allocated to the proxy connection handle in the request. If so, then the first service request has already been issued and the operation is as just described. If not, then the first service request has not yet been issued and operation is as described above with reference to FIG. 4.

The use of proxy handles, resource reservation and deferred resource allocation in the systems described above provides for highly efficient use of resources, ensuring appropriate allocation of pooled resources and reducing the number of resource requests that must be passed to the queue manager. If the number of instances of each application running simultaneously are fairly stable, the resource dispenser 3 will automatically pool appropriate groups of associated resources. Where there are irregularities in the application mix, there will usually be some "fat" resource groups having a queue manager connection and the object handles required by two or more different applications. Resources in these groups can then be dispensed to any of the applications. As a simple example, suppose that only two applications A1 and A2 use the queue manager, each application uses a different pair of queues, and a maximum of twenty instances of each application run simultaneously. However, they do not peak at the same time so that the peak total number of instances is thirty. Over time, the resource dispenser 3 will automatically develop a resource pool with ten groups suitable for application A1 only, ten groups suitable for A2 only, and ten "fat" groups with resources suitable for either. This represents a total of thirty connection handles and eighty queue handles. A prior resource dispenser, dispensing real resources in response to resource requests, would accumulate thirty fat groups, representing a total of thirty connection handles and 120 queue handles. The resource dispenser embodying the present invention thus requires significantly fewer resources to accommodate its users. Moreover, compared to the simple example just described, a system with a wider range of applications and resource requirements would show even greater savings.

While the above description has focused on message queuing systems, embodiments of the invention may be applied to advantage in other data processing systems where resource dispensing involves similar problems. Database systems provide one such example. Here, a service provider in the form of a database provides database services to a plurality of users, and dispenses resources, comprising connection handles and object handles, to users wishing to access the database. The object handles here represent objects such as tables, relationships, equivalencies etc., which can be accessed in the database in retrieving data for a user. Operation of such a database system is entirely equivalent to the message queuing system described above, the object handles being associated with particular connection handles, and the resources being dispensed to a user which then returns dispensed handles as parameters of a subsequent service request to identify the connection and database object to be accessed. The same problem therefore arises with use of known resource dispensers in database systems, and applying embodiments of the present invention in this environment provides the same advantages demonstrated above. While this provides another example of a system where the associated resources are connection and object handles, it will be apparent that the invention can be applied equally to dispensing of other types of associated resources. Moreover, while particularly preferred embodiments have been described in detail above, many changes and modifications may be made to the embodiments described without departing from the scope of the invention. For example, while the operation defined in FIG. 4 is preferred, steps 23 and 30, relating to reservation swapping, may be omitted in some embodiments. In such cases, operation would proceed directly from step 22 to step 24 if no suitable free group is identified in step 22. Moreover, while embodiments employing resource reservation are preferred to ensure that proxies dispensed to users are "underwritten", reservation of resources is not essential. In systems where users can accept unavailable resource errors at the service request stage, proxies may be dispensed in response to resource requests without reserving real resources for the proxies. In such embodiments, the set of proxies dispensed to a user may be matched to pooled resources in response to the first service request, the resource group providing the closest match being selected for allocation to the proxies, and new resources being requested from the service provider at this stage if appropriate resources are unavailable in the pool. Maintenance of the proxy data in processor memory 5 will be simplified in these embodiments since reservation entries for proxies are not required. The proxy details will be stored as before, but an allocation entry, indicating the real resource allocated to each proxy, can simply be made at the service request stage. The allocated resource can then be removed from the pool as before.

While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. A method for allocating resources of a service provider to a plurality of users of the service provider in a data processing system wherein the resources are maintained in a resource pool when not allocated to a user and comprise a plurality of first and second resources, each second resource being associated with a first resource for use together with the associated first resource, and wherein, to invoke performance of a service by the service provider, a user issues a first resource request, requesting a first resource, one or more second resource requests, requesting one or more second resources, and, following receipt of the requested resources, issues a service request including the received first resource and at least one received second resource, requesting performance of the service, the method comprising steps of:

dispensing dummy resources to a user in response to the first and second resource requests from the user, said first resource comprising connection handles, each identifying a connection between the service provider and a user, said second resources comprising object handles, each identifying an object to be used by the service provider in performance of a service for the associated connection, each dummy resource representing a resource requested by the user; and in response to the service request from the user, allocating corresponding resources from the resource pool to dummy resources dispensed to the user.

2. A method as claimed in claim 1 wherein corresponding resources from the resource pool are allocated to dispensed dummy resources according to the best match between the set of resources represented by the dummy resources dispensed to the user and groups of associated first and second resources in the resource pool.

3. A method as claimed in claim 1 including, in response to the first and second resource requests from a user, reserving a resource in the resource pool corresponding to each resource requested by the user.

4. A method as claimed in claim 3 including:

(a) in response to a first resource request from a user, determining whether the resource pool contains an unreserved first resource, if so reserving that first resource for the user, and if not obtaining a new first resource from the service provider, adding the new first resource to the resource pool and reserving that resource for the user;

(b) in response to a the second resource request from the user, determining whether a first group of resources, comprising the first resource reserved for the user and any second resources associated with that first resource in the resource pool, contains an unreserved second resource corresponding to the resource requested in the second resource request, if so reserving that second resource for the user, and if not:

(c) determining whether the resource pool contains a second group of associated, unreserved first and second resources, which group comprises all the resources requested by the user, and if so reserving those resources in the second group for the user and removing the reservations on resources previously reserved for the user.

5. A method as claimed in claim 4 wherein, if it is determined in step (c) that the resource pool does not contain the second group, the method includes obtaining from the service provider a new second resource, associated with the reserved first resource, corresponding to the resource requested in the second resource request, adding the new second resource to the resource pool and reserving that resource for the user.

6. A method as claimed in claim 4 wherein, if it is determined in step (c) that the resource pool does not contain the second group, the method includes determining whether:
    (1) the resource pool contains a third group of associated first and second resources which includes all the resources requested by the user and in which one or more of the resources is reserved; and
    (2) the first group of resources includes a resource corresponding to each reserved resource in the third group;
    if so, interchanging the reservations between the first and third groups and reserving for the user the resource in the third group corresponding to the resource requested in the second resource request, and if not obtaining from the service provider a new second resource, associated with the reserved first resource, corresponding to the resource requested in the second resource request, adding the new second resource to the resource pool and reserving that resource for the user.

7. A method as claimed in claim 4 wherein, if it is determined in step (c) that the resource pool does not contain the second group, the method includes steps of:
    determining whether the resource pool contains a plurality of further groups of associated first and second resources, one or more of the further groups containing resources reserved for respective further users, such that the reservations for the users may be transferred between groups among the first and further groups to obtain a group which has one or more reservations for the user that issued the second resource request and which includes an unreserved second resource corresponding to the resource requested in the second resource request; if so, transferring the reservations between the groups and reserving the unreserved second resource for the user that issued the second resource request; and if not obtaining from the service provider a new second resource, associated with the first resource reserved for that user, corresponding to the resource requested in the second resource request, adding the new second resource to the resource pool and reserving that resource for the user.

8. A method as claimed in claim 3 including, in response to the service request from a user, allocating the resources reserved for the user to the corresponding dummy resources dispensed to the user.

9. A method as claimed in claim 1 including replacing the dummy resources in the service request by the respective allocated resources to the service provider.

10. Apparatus for allocating resources of a service provider to a plurality of users of the service provider in a data processing system wherein the resources are maintained in a resource pool when not allocated to a user and comprise a plurality of first and second resources, each second resource being associated with a first resource for use together with the associated first resource, and wherein, to invoke performance of a service by the service provider, a user issues a first resource request, requesting a first resource, one or more second resource requests, requesting one or more second resources, and, following receipt of the requested resources, issues a service request including the received first resource and at least one received second resource, requesting performance of the service, the apparatus comprising:
    a memory for storing the resources; and
    control logic for receiving the first, second and service requests from the users, the control logic being adapted:
    to maintain the resources in a resource pool of the memory when the resources are not allocated to a user;
    to dispense dummy resources to a user in response to the first and second resource requests from the user, said first resource comprising connection handles, each identifying a connection between the service provider and a user, said second resources comprising object handles, each identifying an object to be used by the service provider in performance of a service for the associated connection, each dummy resource representing a resource requested by the user; and
    in response to the service request from the user, to allocate corresponding resources from the resource pool to dummy resources dispensed to the user.

11. Apparatus as claimed in claim 10 wherein the control logic is adapted to allocate corresponding resources from the resource pool to dispensed dummy resources according to the best match between the group of resources represented by the dummy handles dispensed to the user and groups of associated first and second resources in the resource pool.

12. Apparatus as claimed in claim 10 wherein the control logic is further adapted to reserve a resource in the resource pool corresponding to each resource requested by the user in the first and second resource requests.

13. Apparatus as claimed in claim 12 wherein the control logic is adapted such that:
    (a) in response to a first resource request from a user, the control logic determines whether the resource pool contains an unreserved first resource, if so the control logic reserves that first resource for the user, and if not the control logic obtains a new first resource from the service provider, adds the new first resource to the resource pool and reserves that resource for the user;
    (b) in response to a the second resource request from the user, the control logic determines whether a first group of resources, comprising the first resource reserved for the user and any second resources associated with that first resource in the resource pool, contains an unreserved second resource corresponding to the resource requested in the second resource request, if so the control logic reserves that second resource for the user, and if not:
    (c) the control logic determines whether the resource pool contains a second group of associated, unreserved, first and second resources which group comprises all the resources requested by the user, and if so the control logic reserves those resources in the second group for the user and removes the reservations on resources previously reserved for the user.

14. Apparatus as claimed in claim 13 wherein, if it is determined in step (c) that the resource pool does not contain the second group, the control logic obtains from the service provider a new second resource, associated with the reserved first resource, corresponding to the resource requested in the second resource request, adds the new second resource to the resource pool and reserves that resource for the user.

15. Apparatus as claimed in claim 13 wherein, if it is determined in step (c) that the resource pool does not contain the second group, the control logic determines whether:
   (1) the resource pool contains a third group of associated first and second resources which includes all the resources requested by the user and in which one or more of the resources is reserved; and
   (2) the first group of resources includes a resource corresponding to each reserved resource in the third group;
   if so, the control logic interchanges the reservations between the first and third groups and reserves for the user the resource in the third group corresponding to the resource requested in the second resource request, and if not the control logic obtains from the service provider a new second resource, associated with the reserved first resource, corresponding to the resource requested in the second resource request, adds the new second resource to the resource pool and reserves that resource for the user.

16. Apparatus as claimed in claim 13 wherein, if it is determined in step (c) that the resource pool does not contain the second group, the control logic determines whether the resource pool contains a plurality of further groups of associated first and second resources, one or more of the further groups containing resources reserved for respective further users, such that the reservations for the users may be transferred between groups among the first and further groups to obtain a group which has one or more reservations for the user that issued the second resource request and which includes an unreserved second resource corresponding to the resource requested in the second resource request; if so, the control logic transfers the reservations between the groups and reserves the unreserved second resource for the user that issued the second resource request; and if not the control logic obtains from the service provider a new second resource, associated with the first resource reserved for that user, corresponding to the resource requested in the second resource request, adds the new second resource to the resource pool and reserves that resource for the user.

17. Apparatus as claimed in claim 12 wherein the control logic is adapted to allocate the resources reserved for the user to the corresponding dummy resources dispensed to the user in response to the service request from the user.

18. Apparatus as claimed in claim 10 wherein the control logic is adapted to replace the dummy resources in the service request by the respective allocated resources and forwarding the service request comprising the respective allocated resources to the service provider.

19. Data processing apparatus comprising:
   a service provider for performing services for a plurality of users, the service provider being operable to supply resources for use by the users, the resources comprising a plurality of first and second resources, each second resource being associated with a first resource for use together with the associated first resource, and
   a resource dispenser arranged to receive the resources supplied by the service provider, the resource dispenser comprising apparatus for allocating resources of a service provider to a plurality of users of the service provider in a data processing system wherein the resources are maintained in a resource pool when not allocated to a user and comprise a plurality of first and second resources, each second resource being associated with a first resource for use together with the associated first resource, and wherein, to invoke performance of a service by the service provider, a user issues a first resource request, requesting a first resource, one or more second resource requests, requesting one or more second resources, and, following receipt of the requested resources, issues a service request including the received first resource and at least one received second resource, requesting performance of the service, the apparatus comprising:
   a memory for storing the resources; and
   control logic for receiving the first, second and service requests from the users, the control logic being adapted:
   to maintain the resources in a resource pool of the memory when the resources are not allocated to a user;
   to dispense dummy resources to a user in response to the first and second resource requests from the user, said first resource comprising connection handles, each identifying a connection between the service provider and a user, said second resources comprising object handles, each identifying an object to be used by the service provider in performance of a service for the associated connection, each dummy resource representing a resource requested by the user; and
   in response to the service request from the user, to allocate corresponding resources from the resource pool to dummy resources dispensed to the user.

20. Apparatus as claimed in claim 19 wherein the service provider is a message queuing program for performing message queuing services for the users.

21. Apparatus as claimed in claim 19 wherein the service provider is a database for performing database services for the users.

22. A computer program product comprising a computer usable medium having computer program code therein which, when run in a data processing system, carries out a method for allocating resources of a service provider to a plurality of users of the service provider in a data processing system wherein the resources are maintained in a resource pool when not allocated to a user and comprise a plurality of first and second resources, each second resource being associated with a first resource for use together with the associated first resource, and wherein, to invoke performance of a service by the service provider, a user issues a first resource request, requesting a first resource, one or more second resource requests, requesting one or more second resources, and, following receipt of the requested resources, issues a service request including the received first resource and at least one received second resource, requesting performance of the service, the method comprising steps of:
   dispensing dummy resources to a user in response to the first and second resource requests from the user, said first resource comprising connection handles, each identifying a connection between the service provider and a user, said second resources comprising object handles, each identifying an object to be used by the service provider in performance of a service for the associated connection, each dummy resource representing a resource requested by the user; and
   in response to the service request from the user, allocating corresponding resources from the resource pool to dummy resources dispensed to the user.

* * * * *